W. M. SCOTT.
RAIL JOINT.
APPLICATION FILED MAY 3, 1912.
1,039,597.
Patented Sept. 24, 1912.
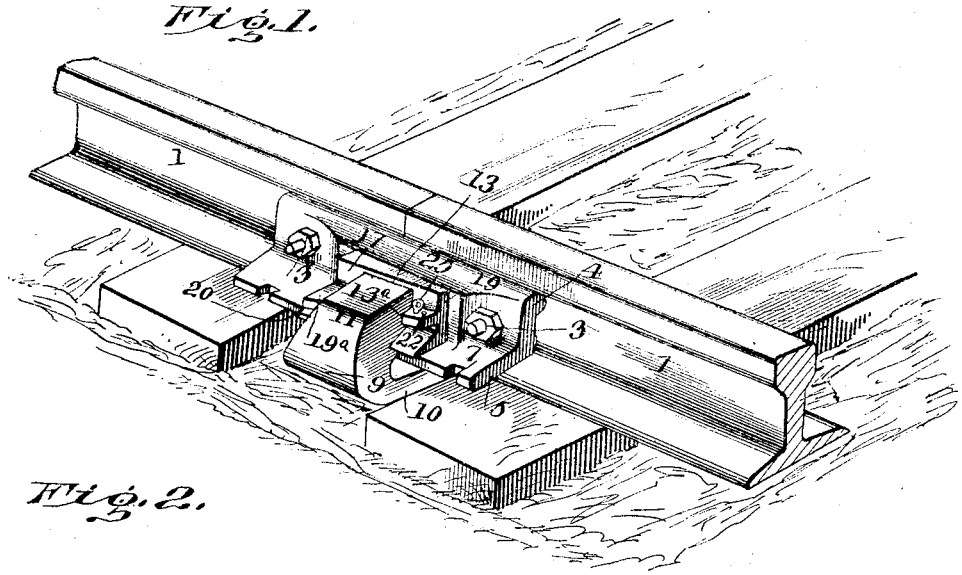
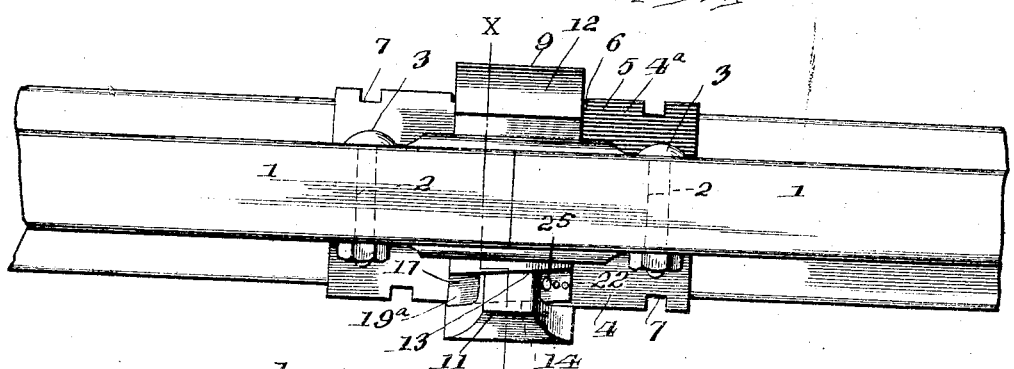
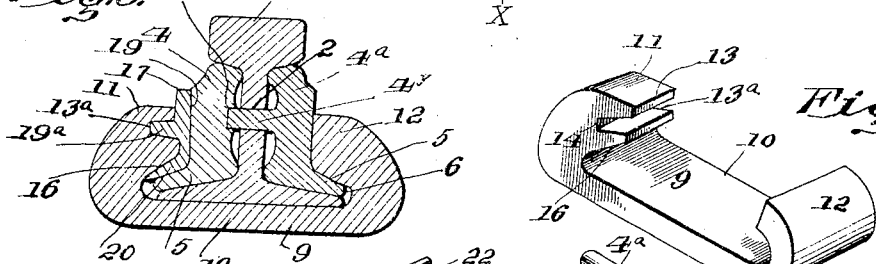
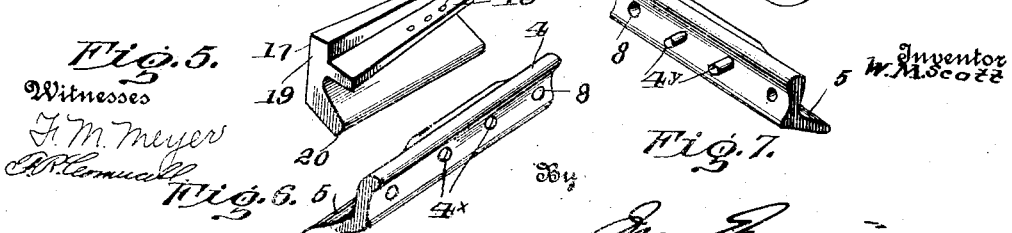
Witnesses
F. M. Meyer
Inventor
W. M. Scott
By
Attorney

UNITED STATES PATENT OFFICE.

WILLIAM M. SCOTT, OF CENTRAL, SOUTH CAROLINA.

RAIL-JOINT.

1,039,597.

Specification of Letters Patent. Patented Sept. 24, 1912.

Application filed May 3, 1912. Serial No. 695,005.

*To all whom it may concern:*

Be it known that I, WILLIAM M. SCOTT, a citizen of the United States, residing at Central, in the county of Pickens and State of South Carolina, have invented certain new and useful Improvements in Rail-Joints; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in rail joints.

The object of the invention is to provide a simple, economical and positive means for effectually securing the rails together.

The invention also relates to the specific details of construction and arrangement of parts which will be hereinafter described and particularly pointed out in the claims.

In the drawings, Figure 1 is a perspective view of my invention applied. Fig. 2 is a plan view. Fig. 3 is a cross section on the line $x$—$x$, Fig. 2. Fig. 4 is a detail view of the clamp. Fig. 5 is a detail view of the key. Figs. 6 and 7 are detailed views of the fish plates.

1—1 indicates the ends of two rails, each having transverse openings, 2 for bolts 3 which secure in position fish plates 4 and 4ª. The fish plates are each provided with a vertical portion to engage the rail web and a downwardly inclined portion 5, to fit against the lower flange of the rail. The central portion of each fish plate is enlarged to provide a substantial brace adjacent the joint between the rails and the inclined flange 5 of the inner fish plate is formed with a seat 6. The flanges 5, both have spike notches 7 near their ends and the vertical portions have openings 8 which register with the openings 2 in the rails.

The fish plate 4 is provided with two seats 4ˣ, and the fish plate 4ª is provided with two lugs 4ʸ. The lugs register with the openings in the rails and when the parts are assembled, the ends of the lugs take into the seats 4ˣ, therefore providing means for preventing the parts being laterally displaced.

A clamp 9 is employed to secure the fish plates against movement. This clamp comprises a horizontal portion 10, from the ends of which extend upwardly and inwardly projecting hook portions 11 and 12 which engage over the flanges 5 of the fish plates. The hook end 11 is reduced in width and is horizontally inclined on its inner surface as shown at 13. The inclined surface 13 is provided with a groove 13ª which is horizontally inclined as shown at 14. The under surface 16 of the hook 11 is normally spaced from the flange 5 of the fish plate 4 to provide a seat for a locking key 17. The locking key 17 is provided with a base portion 19 and an outwardly inclined extended lower flange 20. Projecting from the vertical base portion 19 is a wedge 19ª which is horizontally inclined and is provided with a plurality of openings 22.

The fish plates 4 and 4ª are secured to the rails by the bolts 3 in the usual manner and the hook end 12 of the clamp is fitted in the seat 6. The clamp therefore is located in a plane with the joint between the rails and consequently both hook ends 11 and 12 act against the rails at this point. The clamp having been positioned, the key 17 is driven into the slot 13ª, the vertical base 19 bearing against the enlarged portion of the fish plate 4, while the inclined flange 20 engages between the under surface 16 of the hook end 11, and the flange 5 of said fish plate. When the key is driven into place the wedge 19ª draws the hook end tight against the inside fish plate 4ª and at the same time binds the hook end 11 and the fish plate 4 against the outside of the rail. In addition to this action, the downwardly inclined wedge portion 20 of the key serves to force the inclined flange 5 of the fish plate 4 down on the lower flange of the rails and at the same time draw the clamp up against the bottom of the rails, consequently providing lateral, as well as a downward binding action. Under these circumstances, the clamp is positively and securely held in position so that if, perchance, the fish plates should break at any point between the bolts 3, the rails will be securely held in alinement. After the key is driven in position, a cotter pin 25 is inserted in one of the openings 22 to prevent said key being jarred from its seat.

What I claim is:—

1. In combination, a pair of rails, fish plates adjacent the joint of said rails, a clamp extending under the rails and provided at its ends with inturned hooks which fit over the fish plates, one of said hook ends having a horizontally inclined groove, a key having a vertical portion and a downwardly inclined flange, the vertical portion and flange fitting between the inner and under surface of the hook end and the fish plate, the vertical portion having an outwardly extended wedge shape flange which fits in the incline groove on the hook end of the clamp, and means for holding the key in position.

2. In combination, two abutting rails, fish plates extending across the joint formed by the abutting rails, each of said fish plates having an enlarged portion at its center, bolts for securing the fish plates to the rail, a clamp having a horizontal portion extending under the rail and provided at its edges with hooks which engage over the lower edges of the fish plates, the inner surface of one of the hooks having a groove which inclines horizontally, a key having a vertical base and a downwardly inclined flange, the vertical base and flange fitting between the inner and lower surfaces of the grooved hook, a wedge extending outwardly from the vertical base, said latter wedge being horizontally inclined and fitting in the groove, and means for locking the key in position.

3. In combination, a pair of abutting rails formed with openings, fish plates on opposite sides of the rails, one of said fish plates having seats, the other fish plate having lugs which pass through the openings in the rails and fit in the seats, the central portions of the fish plates being enlarged and having downwardly inclined base flanges, one of said flanges having a clamp seat, bolts for securing the fish plates to the rails, a clamp having a horizontal portion fitting under the rails in a plane with the joint, the ends of the horizontal portion having inturned hooks one of which fits in the seat and the other being reduced in width and formed on its inner surface with a groove which inclines horizontally, a key inserted between the end of the hook with the groove and the adjacent enlarged portion of the fish plate, said key comprising a vertical portion and a downwardly inclined flange which fits between the grooved hook and one of the fish plates, the vertical portion having a wedge which inclines horizontally and which fits in the groove, and a lock for securing the key in position.

In testimony whereof I have signed my name to this specification in the presence of two subscribing witnesses.

WILLIAM M. SCOTT.

Witnesses:
L. T. SHIRLEY,
P. L. EZELL.

Copies of this patent may be obtained for five cents each, by addressing the "Commissioner of Patents, Washington, D. C."